United States Patent [19]

Barraud et al.

[11] Patent Number: 4,511,604
[45] Date of Patent: Apr. 16, 1985

[54] PROCESS AND APPARATUS FOR PRODUCING ALTERNATE MONOMOLECULAR LAYERS

[75] Inventors: André Barraud, Bures-sur-Yvette; Jean Leloup, Gif sur Yvette, both of France

[73] Assignee: Commissariat a l'Energie Atomique, Paris, France

[21] Appl. No.: 584,918

[22] Filed: Feb. 29, 1984

[30] Foreign Application Priority Data

Mar. 4, 1983 [FR] France ............................. 83 03578

[51] Int. Cl.³ ........................... B05C 3/12; B05D 1/20
[52] U.S. Cl. .................................. 427/402; 118/402; 118/419; 427/434.3
[58] Field of Search ............... 427/402, 407.1, 434.3; 118/58, 402, 423, 419

[56] References Cited

U.S. PATENT DOCUMENTS

| | | | |
|---|---|---|---|
| 2,078,214 | 4/1937 | Esselen et al. | 91/68 |
| 2,087,504 | 7/1937 | Davis | 91/68 |
| 2,838,023 | 6/1958 | Jaime | 118/57 |
| 2,945,471 | 7/1960 | Harrold | 118/58 |
| 4,093,757 | 6/1978 | Barraud et al. | 118/402 X |

FOREIGN PATENT DOCUMENTS

430388 10/1938 Belgium .
2341199 9/1977 France .

*Primary Examiner*—Michael R. Lusignan
*Attorney, Agent, or Firm*—Oblon, Fisher, Spivak, McClelland & Maier

[57] ABSTRACT

The present invention relates to a process and to an apparatus for producing alternate monomolecular layers. In per se known manner, a substrate is passed through the surface of a liquid contained in a vessel and over which has previously been spread a monomolecular layer of a given substance. According to the invention, the vessel is subdivided into two compartments. A monomolecular layer is deposited on the surface of the liquid contained in each of the compartments. The latter are arranged in such a way that there can be no contact between the monomolecular layers in each of them and the substrate is alternately moved between the compartments.

10 Claims, 14 Drawing Figures

PROCESS AND APPARATUS FOR PRODUCING ALTERNATE MONOMOLECULAR LAYERS

BACKGROUND OF THE INVENTION

The present invention relates to processes for the production and deposition of monomolecular layers on a substrate and more particularly relates to a process and an apparatus for producing alternate monomolecular layers, i.e. sequences of layers of two different materials.

Monomolecular layers, particularly of organic compounds, have numerous applications, especially in the electronics field, where they make it possible to produce metal-insulant-metal structures in which the insulant layer has a perfectly controlled and defined thickness.

Figure 1:
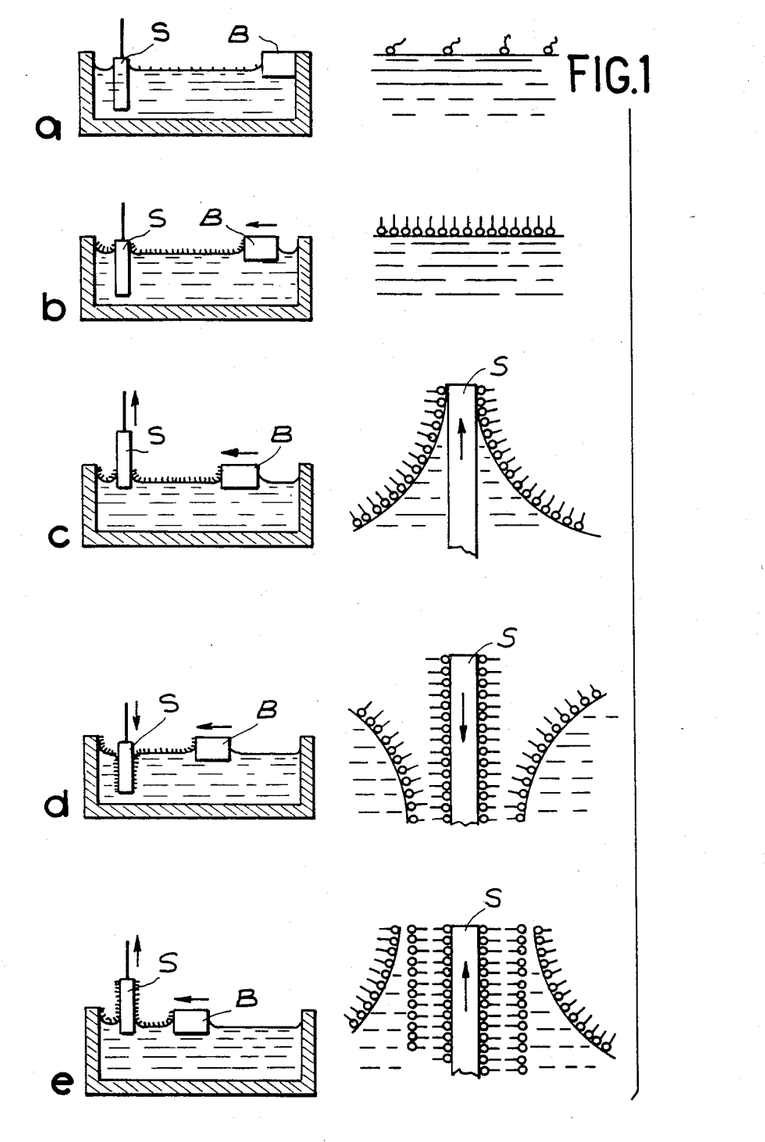
FIGS. 1a to 1e, already described, the principle of the standard Langmuir-Blodgett process, FIG. 2 a diagrammatic perspective view illustrating the general principle of the process according to the invention.

The best known process for producing monomolecular layers is the so-called Langmuir-Blodgett process, which consists of spreading a solution of the molecule to be deposited over the surface of a liquid, generally water. This process is illustrated by FIGS. 1a to 1e. The solution is spread over the surface (FIG. 1a), followed by the evaporation of the solvent to form the monomolecular layer, which is then compressed at a given surface pressure by the displacement of a floating barrier B (FIG. 1b). Deposition takes place by immersing and then raising again the substrate S in the water of the vessel through said monomolecular layer (FIGS. 1c, 1d and 1e). Generally, the molecules of the layer to be deposited are amphiphilic molecules, i.e. they have both a hydrophilic part and a hydrophobic part. Following the evaporation of the solvent, the molecules are oriented in such a way that the hydrophilic part is located against the surface of the water, whilst the hydrophobic part tends to move away therefrom (FIG. 1b). Usually, the hydrophobic part is constituted by an inert aliphatic chain and the hydrophilic part contains the active part of the molecules.

The standard procedure for compressing the monomolecular layer consists of displacing a floating barrier on the surface of the liquid as deposition is taking place on the substrate, in order to maintain the surface pressure at the desired value. At the end of the operation, the mobile barrier is returned to its initial position, so that the operation can be recommenced by introducing a further solvent quantity onto the surface of the water. Although this process makes it possible to easily produce monomolecular layers, it is apparent that it cannot be used for ensuring the production and deposition in a continuous manner of monomolecular layers on solids having a considerable length, such as plastic or metal tapes or strips. Thus, it is necessary to interrupt the operation every so often in order to resupply the bath with the solution of the material to be deposited.

French Pat. No. 2,341,199, belonging to the present Applicant, describes an improvement to this process resulting from the use of rotary rollers, which are partly immersed in the water of of a compartmentalized vessel making it possible to transfer the monomolecular layer from one compartment to the other under pressure. It is thus possible to carry out continuous deposition on plastic or metal strips or bands. The film which can be obtained by one or other of these two processes can be transferred onto a solid substrate by merely passing the latter through the surface of the water. As a result of successive immersions and emersions, other monomolecular layers, identical to the first, can be deposited the hydrophilic part of one layer being in contact with the hydrophilic part of the following layer and the same applies with respect to the hydrophobic parts. The thus obtained deposit is called the Langmuir-Blodgett or L.B. film.

However, this process still suffers from a disadvantage. Although it makes it possible to carry out continuous deposition, it only makes it possible to produce Langmuir-Blodgett layers which are identical to one another. It is also possible to envisage the successive use of two independent vessels with an overhead transfer of the sample, but this only makes it possible to achieved paired sequences and not alternate sequences, because the contacting hydrophilic parts necessarily belong to two identical molecules.

SUMMARY OF THE INVENTION

The object of the present invention is to obviate these disadvantages by means of a process and an apparatus making it possible to produce alternate monomolecular layers, i.e. the hydrophilic part of a monomolecular layer of a first material is in contact with the hydrophilic part of a monomolecular layer of a second material, which differs from the first. One of the materials (A) can be a molecule, whilst the other material (B) can be a different molecule. The materials can also be mixtures, whereby one can contain certain constituents of the other, or optionally all of these constituents.

The present invention therefore relates to a process for the production of alternate monomolecular layers on at least one substrate, of the type in which the substrate is passed through the surface of a liquid contained in a vessel and over which has previously been spread a monomolecular layer of a given substance, wherein the vessel is subdivided into at least two compartments, a monomolecular layer is deposited on the surface of the liquid contained in each of these compartments, the latter being arranged in such a way that there can be no contact there between the monomolecular layers located in each of them and the substrate is alternately passed from one compartment to the other, transfer solely taking place within the liquid, or solely above the latter, or alternatively within the liquid or above the surface thereof.

Obviously, the monomolecular layers in each of the two compartments can be either of the same substance, or of two different substances constituted by a single material or a mixture of materials. As the monomolecular layers are films, where the upper face is not equivalent to the lower face (vectorial vertical orientation, of FIG. 1), the process enables the user to orient at random the molecules of each layer in a successive manner as a result of the choice of the direction in which the surface of the liquid contained in the vessel is traversed.

Thus, the process not only makes it possible to obtain sequences of successive molecules in superimposed monomolecular layers, but also to vectorially orient the molecules in each layer.

The invention also relates to an apparatus for performing this process and, according to the main feature of the apparatus, the latter comprises: a vessel separated into two compartments by a partition, whereof each least part is shaped in such a way that it permits the passage of the substrate from one compartment to the other within the liquid and means for transferring the substrate from one compartment to the other without there being any contact between the monomolecular layers contained in each of these compartments.

According to a first embodiment, the partition, which is partly above and partly below the surface of the liquid, has an opening permitting the passage of the substrate from one compartment to the other and the means for transferring this substrate comprise a lifting system making it possible to move the substrate both vertically and horizontally, as well as two mobile barriers positioned above the opening on the faces of the partition corresponding to each of the compartments respectively.

According to another embodiment of this apparatus, the partition, which is partly above and partly below the surface of the liquid, has an opening permitting the passage of the substrate from one compartment to the other and the means for transferring the substrate comprise a lifting system making it possible to move the substrate both vertically and horizontally, as well as two assemblies of elastic plates positioned in the vicinity of the liquid surface and level with the opening on each of the faces of the partition corresponding to the two compartments.

According to a third embodiment of the apparatus according to the invention, the means for transferring the substrate comprise a vertically movable support, two arms pivotably mounted on said support and which can be immersed in each of the compartments, at least one of the arms being mobile in translation relative to the support and means for fastening the substrate located at the lower end of each of the two arms.

According to yet another embodiment, the means for transferring the substrate comprise two vertically mobile supports, which can be immersed into each of the compartments, means for fastening the substrate at the lower end of each of the supports, a rod placed within the liquid and rotatable about a vertical axis and means for fastening the substrate at each end of the rod.

According to a final constructional variant of this apparatus, the means for transferring the substrate comprise a rotatable support and means for fixing the substrate to the support, the latter being placed in an opening of the partition level with the liquid surface and shaped in such a way that it prevents any contact between the monomolecular layers located in each of these compartments.

In the latter case, the means for fixing the substrate to the support can comprise at least one rod mounted on the support, said rod having a first end fixed to the support and a second end provided with means for fastening the substrate.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 2:
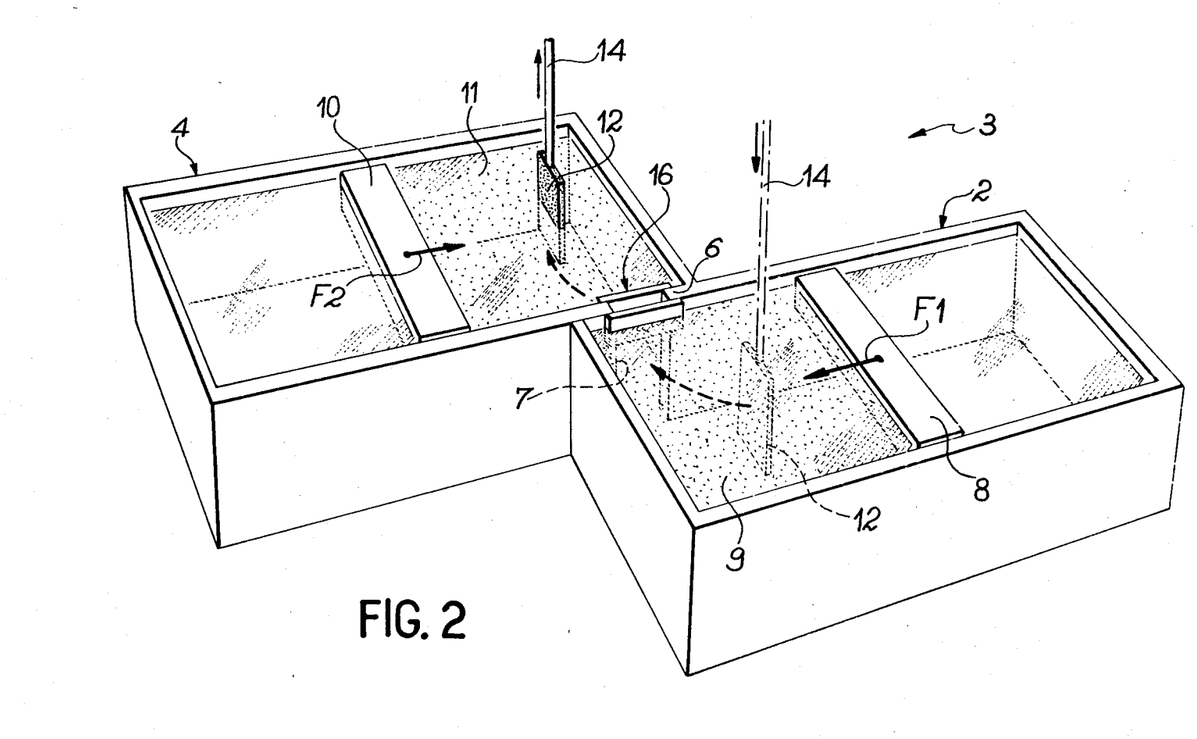

FIG. 2 shows that the apparatus essentially comprises two vessels 2, 4, which are joined by a common wall part 6 and which can therefore be looked upon as two compartments of a single vessel 3. Wall 6 has an opening 7 linking the two compartments, the upper part of opening 7 being equipped with an apparatus 16 to be described hereinafter relative to FIGS. 3 to 8 and which prevents any contact between the monomolecular layers in each of the compartments 2 and 4. A floating barrier 8 movable in the direction of arrow F1 on the surface of the liquid contained in vessel 2 makes it possible to compress the monomolecular layer 9 contained in vessel 2, whilst a floating barrier 10 movable in the direction of arrow F2 on the surface of the liquid contained in compartment 4 makes it possible to compress the monomolecular layer 11 contained in said compartment.

According to the invention, a substrate or sample 12 is introduced into that part of vessel 2 containing the monomolecular layer 9 by using lifting means 14, diagrammatically represented by mixed lines in the drawing and which make it possible to move sample 12 both in a vertical direction and in a horizontal direction. Once the sample 12 has passed from top to bottom through the monomolecular layer 9, it is transferred under water into compartment 4 through opening 7, the apparatus 16 obviously being arranged in such a way that it permits the passage of lifting means 14 without there being any contact between the monomolecular layers 9 and 11. Once the sample 12 is located in vessel 4, it is raised by lifting means 14, which makes it possible to deposit monomolecular layer 9 on layer 11.

Figure 3:
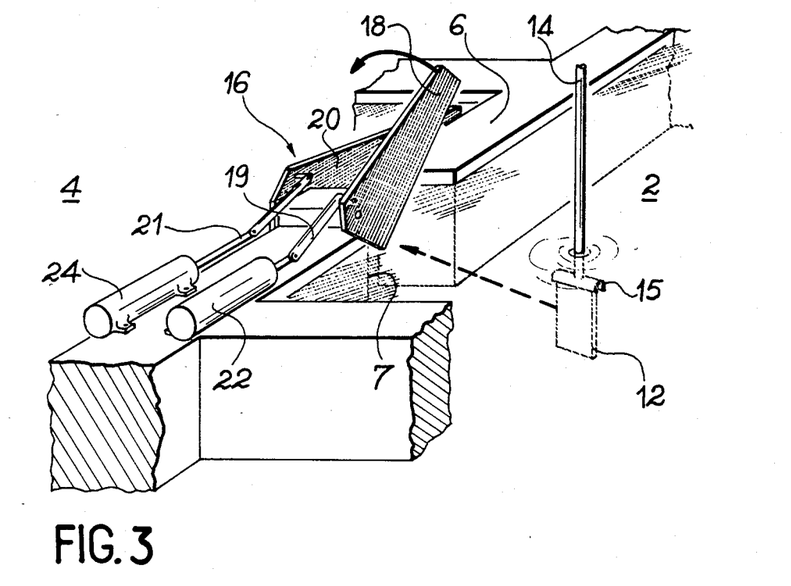
FIG. 3 a larger scale diagrammatic perspective view illustrating a first embodiment of the apparatus for performing this process.

FIG. 3 is a larger scale perspective view of a first embodiment of the means 16 for separating the monomolecular layers contained in each of the two compartments.

It is possible to see the compartments 2 and 4 separated by partition 6 which, in this region, has an opening 7 permitting communication between the liquid contained in vessels 2 and 4. At this point, the arrangement is such that partition 6 is formed by two portions, whereof at least part emerges above the surface of the liquid.

At this point, partition 6 has an adequate thickness (3 cm in the present case) to permit the installation of two barriers 18 and 20 on each of the vertical faces of partition 6 corresponding to compartments 2 and 4 respectively. Barriers 18 and 20 are positioned in the vicinity of the liquid surface, so as to be able to close the opening 7 at this level and prevent the monomolecular layer of one compartment from passing into the other.

In FIG. 3, barrier 18 is shown in the open position and barrier 20 in the closed position. The movements of barriers 18 and 20 are controlled by motors 22 and 24 by lever systems 19 and 21 respectively. Thus, at opening 7, barriers 18, 20 make it possible to produce a type of lock chamber between compartments 2, 4. Thus, it is possible to transfer sample 12, held by lifting means 14 from one compartment to the other without the monomolecular layer contained in a particular compartment from passing into the other.

In the special case of FIG. 3, the lifting means 14 are constituted by a vertical rigid rod, connected to not shown displacement means, at the lower end of which is provided a clip 15 for holding sample 12 in the form of a rectangular plate. Normally, both barriers 18 and 20 are in the closed position. When sample 12 has passed through the monomolecular layer 9 of compartment 2 making it possible to deposit a first monomolecular layer, barrier 18 is opened and the assembly constituted by rod 14 and sample 12 is moved into the lock chamber formed by barriers 18 and 20. Barrier 18 is then closed and, as part of the monomolecular layer 9 in vessel 2 has entered the lock chamber, it is necessary to eliminate this before opening barrier 20 in order that the sample 12 can enter vessel 4. For example, the film can be eliminated by suction, but any other means can be envisaged. Once the lock chamber has been cleaned, barrier 20 is raised, which makes it possible for lifting means 14 to transfer the sample 12 into vessel 4.

This is followed by the deposition of a second layer by passing through the surface of the liquid contained in vessel 4. Barrier 20 is closed immediately after the passage of the sample and as part of the monomolecular layer contained in said vessel has penetrated the lock chamber, the latter must be cleaned as hereinbefore. In the case of FIG. 3, the total transfer time is approximately one minute.

Thus, during the first passage in vessel 2, it is the hydrophobic part of the layer which has been deposited in contact with the substrate surface, whilst during the passage in vessel 4 it is the hydrophilic part of the monomolecular layer contained in said vessel which has been deposited on the substrate, i.e. in contact with the hydrophilic part of the first layer.

In the case described hereinbefore, the lifting means 14 for sample 12 are constituted by a rigid rod, but it is possible to use other systems, e.g. two flexible wires. The latter (or the rod) can be advantageously connected to a winch, which is mobile in horizontal translation and whose movements control the raising of barriers 18 and 20 when sample 12 approaches. It is also possible to arrange the apparatus in such a way that the horizontal movement of the winch is controlled by lifting means 14 being at the end of their travel.

Figure 4:
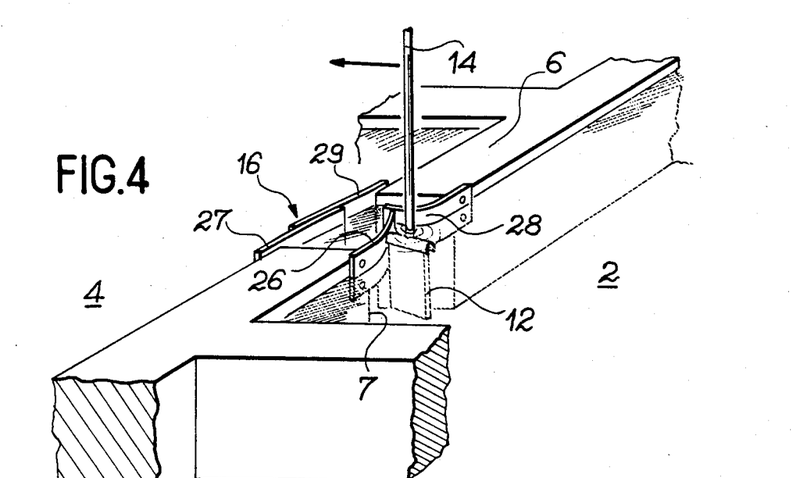
FIG. 4 a view similar to FIG. 3 illustrating another embodiment of the apparatus according to the invention.

FIG. 4 illustrates a variant of the apparatus according to FIG. 3, in which barriers 18 and 20 are replaced by two assemblies of two elastic plates located in the vicinity of the liquid surface on each of the faces of partition 6, namely a first assembly of two plates 26, 28 on the side of vessel 2 and a second assembly of two plates 27 and 29 on the side of vessel 4. The plates are normally in the closed position, like plates 27, 29 in FIG. 4, in order to define a lock chamber and prevent any communication between the monomolecular layers contained in each of the vessels.

When the first layer has been deposited in vessel 2, lifting means 14 are moved in the direction of opening 7. The effect of displacing the assembly is to bring about the opening of the first plates 26, 28, which enable support 14 to enter the lock chamber. Obviously, in this case, support 14 must be constituted by a rigid rod, in order to ensure the spacing of the plates. As the latter close immediately following the passage of sample 12, only a small part of the monomolecular layer contained in vessel 2 passes into the lock chamber and it is merely necessary to carry out brief cleaning before the sample is introduced into vessel 4. For example, cleaning can take place by means of a capillary tube, whose movements are controlled by the means for displacing rod 14. It is no longer necessary to have a stop time in the lock chamber and very short transfer times of approximately 20 seconds are obtained.

Figure 5:
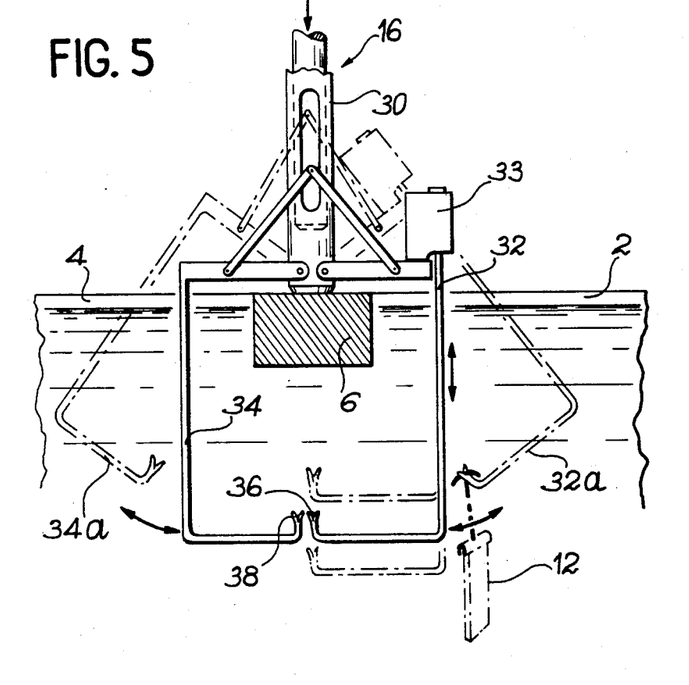
FIG. 5 a vertical sectional diagrammatic view of a third embodiment of the apparatus according to the invention.

FIG. 5 illustrates a third embodiment of the apparatus according to the invention, in which the partition 6 separating the vessels 2 and 4 has no opening comparable to opening 7 of FIGS. 2 to 4. Instead, it is arranged in a continuous manner on the liquid surface, in order to separate the monomolecular layers, whilst permitting a communication between the two compartments below the liquid surface.

Figure 6:
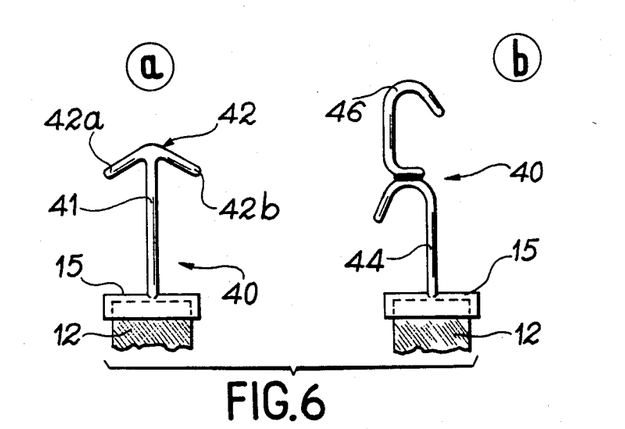
FIGS. 6a and 6b, diagrammatic views illustrating two embodiments of the fastening means mounted on the substrate in the apparatus of FIG. 5.

In this case, apparatus 16 permitting the passage of the sample from one compartment to the other essentially comprises a support 30, which can move vertically above partition 6 and on which are mounted two arms 32, 34, which can in each case be introduced into the two vessels 2, 4 respectively and can pivot about an axis perpendicular to the plane of the drawing. Thus, these arms can move between the spaced apart positions 32a, 34a shown in mixed lines in the drawing and bent in positions 32, 34 shown in continuous lines. Moreover, one of the two arms, e.g. arm 32, is mobile in translation by means of an electric motor 33. At the lower end of each of the arms 32 and 34, there are hooks 36, 38 making it possible to fasten sample 12. The latter is also provided with fastening means, which will be described hereinafter relative to FIG. 6.

The apparatus operates in the following way. Initially, support 30 is moved away from partition 6, arms 32, 34 being in their spaced apart position 32a, 34a and entirely out of the water. Sample 12 is attached to the lower part of arm 32 and the complete entity is introduced into the vessel, in such a way that the substrate 12 traverses the monomolecular layer contained in vessel 2, whilst arm 34 enters vessel 4, which permits the deposition of the first layer. The two arms are then pivoted to bring them into the vertical position shown by continuous lines in the drawing. The shape and dimensions of the apparatus are such that, in this position, hooks 36 and 38 located at the lower end of each of the arms are very close to one another. Motor 33 is then put into operation, so as to lower arm 32, so that at the time when hook 36 passes in the vicinity of fixed hook 38, the latter hooks the sample, whilst arm 32 continues its downward travel. Arm 34 is then pivoted into position 34a, whilst arm 32 is pivoted into position 32a and the complete entity is raised, which makes it possible to deposit the second layer by passing the sample through the surface of the liquid in vessel 4.

In order that the vertical movement of arm 32 permits the hooking of the sample by hooks 32, a special device is provided on sample 12 and is illustrated in FIGS. 6a and 6b. It is possible to see substrate 12 held by clip 15, on which are mounted fastening means 40. In the case of FIG. 6a, the latter essentially comprise a vertical rod 41, to which is fixed a part 42 consisting of two portions 42a, 42b. In this case, hook 36 at the lower end of arm 32 hooks device 40 by means of one of the two portions of part 42, e.g. portion 42b and during the downward movement, the other portion 42a of part 42 cooperates with hook 38 located at the lower end of arm 34. This arrangement ensures the passage of the sample from one arm to the other during the downward movement of arm 32.

In the case of FIG. 6b, the fastening means 40 are constituted by two superimposed hooks, i.e. lower hook 44 welded to upper hook 46. In this case, it is one of the two hooks, e.g. hook 44 which is maintained by hook 36 of arm 32 and during the downward movement, it is hook 46 which cooperates with hook 38 and arm 34.

Figure 7:
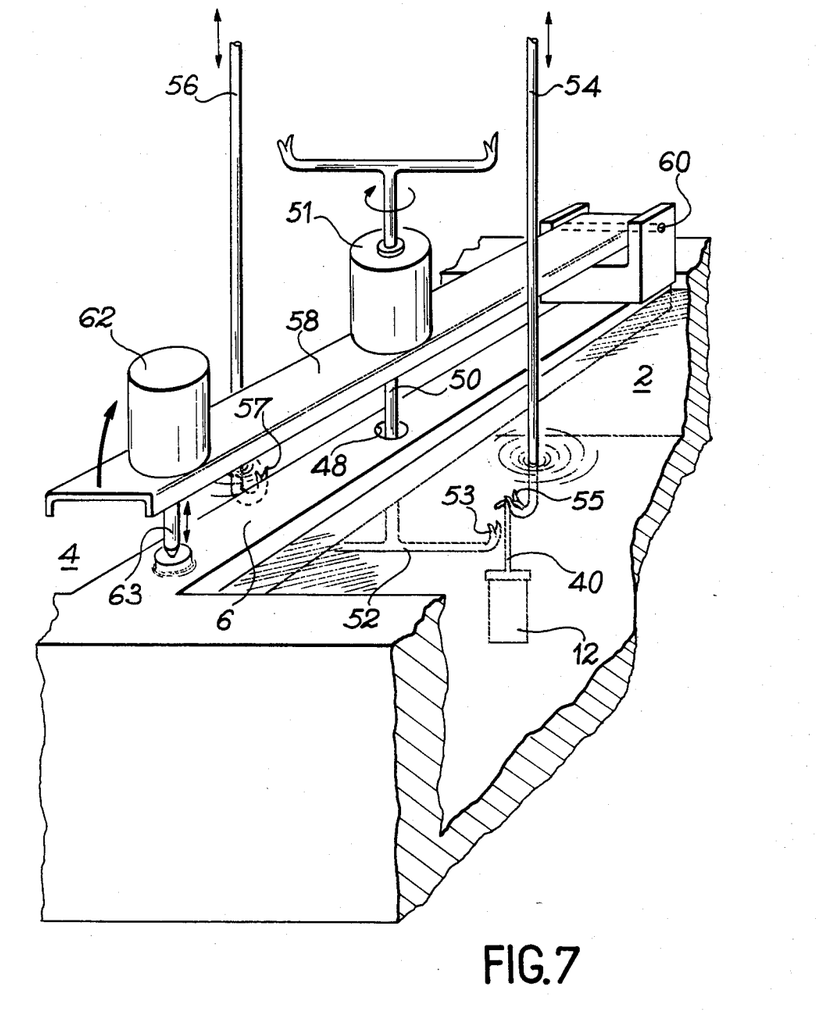
FIG. 7 a perspective diagrammatic view of a fourth embodiment of the apparatus according to the invention.

In the case of FIG. 7, the partition 6 separating vessels 2 and 4 is still in the vicinity of the surface, as in the case of FIG. 5. However, it has an orifice 48 permitting the passage of a vertical rod 50, which is immersed in the liquid contained in the vessel and on the lower part of which is secured another horizontal rod 52. At each of its ends, the latter carries a hook, such as e.g. hook 53 on the side of vessel 2, for the purpose of hooking the sample. Two vertically movable rigid rods 54, 56 are introduced into each of the compartments 2, 4 respectively and are provided in their lower part with hooks 55, 57 enabling the passage of sample 12, provided with fastening means 40 similar to those described relative to FIGS. 5, 6a and 6b, from rod 54 to rod 52.

The apparatus according to FIG. 7 functions in the following way. By means of device 40, sample 12 is firstly attached to hook 55 located in the lower part of rod 54 and the latter is vertically displaced from top to bottom in order to deposit the first monomolecular layer in compartment 2. Rod 52 is oriented in such a way that hook 53 is located in compartment 2.

Rod 54 is then brought sufficiently close to the end of rod 52 corresponding to hook 53 to enable its downward movement to permit the passage of sample 12 from one rod to the other, in the same way as described hereinbefore relative to FIG. 5. Motor 51 is then put into operation in such a way that hook 53 of rod 52 passes from vessel 2 to vessel 4. At this instant, rod 56, which was initially in the low position, is raised in order that hook 57 located at the lower end thereof can cooperate with fastening means 40 for sample 12 and raise the latter in order to bring about the deposition of the second layer. This arrangement makes it possible to simultaneously ensure the transfer of two samples in opposite directions, the operation lasting approximately 30 seconds. During the periods of non-use, rod 52 is brought parallel to partition 6, in order to leave the maximum space in each compartment.

It is also possible to arrange the apparatus in such a way that it is the assembly constituted by rods 50 and 52 which is raised, in order to attach the sample when rod 54 finishes its downward travel. For this purpose, winch 51 is mounted on a longitudinal support 58 parallel to partition 6 and having roughly the same length as the latter. Support 58 moves around a spindle 60, located at one of its ends. The movement is controlled by a motor 62 mounted at the opposite end of support 58, motor 62 driving a rod 63 by a screw-nut system. The end of rod 63 opposite to motor 62 bears on the upper surface of partition 6. Thus, the rotation of motor 62 brings about the removal or retraction of rod 63, which brings about the pivoting of support 58 around spindle 60.

Figure 8:
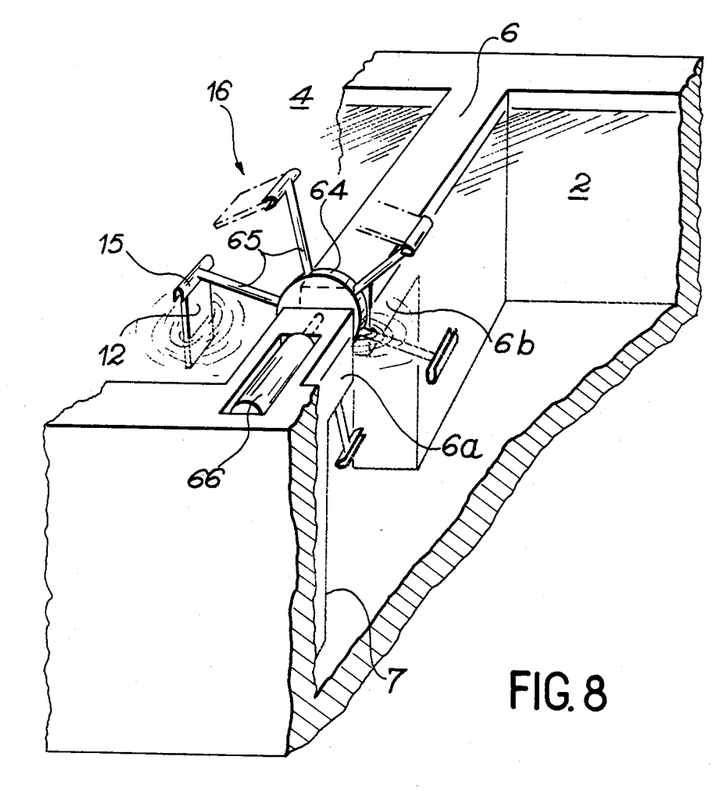
FIG. 8 a perspective diagrammatic view of a fifth embodiment of the apparatus according to the invention.

FIG. 8 illustrates a final embodiment of the apparatus according to the invention. In this case, partition 6 drops to the bottom of the vessel and has an opening 7, as in the case of FIGS. 2 to 4. However, in the upper part of opening 7, i.e. in the vicinity of the liquid surface, partition 6 has two overhanging portions 6a, 6b separated by a gap containing a drum, whose thickness is roughly equal to the width of the space between portions 6a and 6b of partition 6. Drum 64 can be rotated by a motor 66 and has a plurality of rigid rods 65 extending radially towards the outside. The sample is secured by a clip means 15 at the end of each of the rods. When the sample is a rectangular plate, the assembly is arranged in such a way that the plane of substrate 12 is roughly perpendicular to the direction defined by the corresponding rod 65. In the case of FIG. 8, the rotary movement of drum 64 enables each sample to pass from one vessel to the other alternatively underwater and overwater, which permits numerous combinations for the deposit. Thus, the system can rotate in both directions and it is possible to stop or reverse the operating directions, as a function of the desired cycle.

In the case of FIG. 8, equivalent results are obtained by replacing the system of clip means by flexible wires, at the end of which are suspended the samples to be coated.

Tests carried out with the variants described hereinbefore gave the following results. Firstly, all the systems give comparable transfer speeds with very short dead times far shorter than those required in the case of the Langmuir-Blodgett process. The apparatuses according to FIGS. 3, 4 and 8 are simpler and easier to construct than those according to FIGS. 5 and 7.

However, in the first three cases, there are plunging parts having to perform transverse movements, namely lifting means 14 which can be constituted either by a rigid rod or by flexible wires, which can cause disturbances on the liquid surface, which are eliminated with the systems according to FIGS. 5 and 7.

Figure 9:
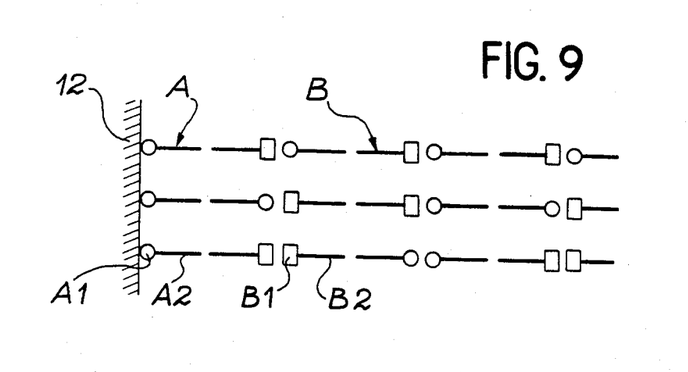
FIG. 9 a diagrammatic view illustrating various sequences of monomolecular layers which can be obtained by the process according to the invention.

FIG. 9 shows various sequences which can be obtained with the process according to the invention and which could not be obtained with the prior art processes. FIG. 9 corresponds to the case where two monomolecular layers of two different materials A and B are deposited. It can be seen from the drawing that the molecules of the first material A consist of a hydrophilic part A1, diagrammatically represented in the form of a circle, and a hydrophobic part A2 diagrammatically shown in the form of a solid line. In the same way, the molecules of the second material B consist of a hydrophilic part B1 diagrammatically represented by a square and a hydrophobic part B2 diagrammatically represented by a continuous line. In the case of the upper line, as from the outer surface of substrate 12, a molecule A was firstly deposited, whose hydrophilic part is on the surface of substrate 12, followed by a molecule B oriented in the opposite direction, then followed by a molecule A oriented in the same direction as the first molecule A, then a further molecule B and so on. The hydrophilic part of a molecule A is always in contact with the hydrophilic part of a molecule B and the same applies with respect to the hydrophobic parts. It is not possible to produce monomolecular layers in which a hydrophilic part of a molecule is in contact with the hydrophobic part of the molecule constituting the adjacent layer. This sequence was obtained by passing the sample alternately above and below the surface of the liquid contained in the vessel.

On the intermediate line, the sequence obtained consists of two molecules A oriented in opposite directions, followed by two molecules B also oriented in opposite directions, then two molecules A oriented in opposite directions and so on, the hydrophilic part of a molecule A being in contact with the hydrophilic part of a molecule B, whilst two contacting hydrophobic parts belong to two identical molecules. This result is obtained by transfers from one compartment to the other underwater.

Finally, in the case of the lower line, the sequence is such that the contacting hydrophilic parts belong to two identical molecules, whilst the contacting hydrophobic parts belong to two different molecules, this being obtained by overhead transfer only.

In order to check the alternate nature of the layers deposited according to the cycles described hereinbefore, infrared spectrometry tests were carried out on behenic acid-porphyrin sequences. If the deposit is in accordance with the upper line of FIG. 9, there is an absorption band at 1725 cm$^{-1}$ which disappears and is replaced by an absorption band between 1700 and 1705 cm$^{-1}$ if the deposit is in accordance with the lower line of FIG. 9.

Thus, the process and apparatus according to the invention have particularly interesting advantages, because it is possible to produce alternate monomolecular layers with different molecular orientation combinations. This can be done in a simple and rapid manner, the transfer times between the individual vessels being greatly reduced. Moreover, the apparatus for performing this process can be easily produced, so that the installation is not expensive.

Finally, it is obvious that the invention is not limited to the embodiments described hereinbefore and numerous variants thereof can be envisaged without passing beyond the scope of the invention. In particular, in all cases, the compression of the monomolecular layers can either take place by the standard Langmuir-Blodgett process, or by the process using rotary rollers and as illustrated in the aforementioned French Pat. No. 2,341,199.

What is claimed is:

1. A process for the production of alternate monomolecular layers on at least one substrate, of the type in which the substrate is passed through the surface of a liquid contained in a vessel and over which has previously been spread a monomolecular layer of a given substrate, wherein the vessel is subdivided into at least two compartments, a monomolecular layer is deposited on the surface of the liquid contained in each of these compartments the latter being arranged in such a way that there can be no contact there between the monomolecular layers located in each of them and the substrate is alternately passed from one compartment to the other, transfer solely taking place within the liquid, or solely above the latter, or alternatively within the liquid or above the surface thereof.

2. A process according to claim 1, wherein the monomolecular layers in each of the compartments are monomolecular layers of the same substance.

3. A process according to claim 1, wherein the monomolecular layers in each of the said compartments are monomolecular layers of two different substances, constituted by a single material or a mixture of materials.

4. An apparatus for producing alternate monomolecular layers on at least one substrate, wherein it comprises a vessel separated into two compartments by a partition, whereof each least part is shaped in such a way that it permits the passage of the substrate from one compartment to the other within the liquid and means for transferring the substrate from one compartment to the other without there being any contact between the monomolecular layers contained in each of these compartments.

5. An apparatus according to claim 4, wherein the partition, which is partly above and partly below the surface of the liquid, has an opening permitting the passage of the substrate from one compartment to the other and the means for transferring this substrate comprise a lifting system making it possible to move the substrate both vertically and horizontally, as well as two mobile barriers positioned above the opening on the faces of the partition corresponding to each of the compartments respectively.

6. An apparatus according to claim 4, wherein the partition, which is partly above and partly below the surface of the liquid, has an opening permitting the passage of the substrate from one compartment to the other and the means for transferring the substrate comprise a lifting system making it possible to move the substrate both vertically and horizontally, as well as two assemblies of elastic plates positioned in the vicinity of the liquid surface and level with the opening on each of the faces of the partition corresponding to the two compartments.

7. An apparatus according to claim 4, wherein the means for transferring the substrate comprise a vertically movable support, two arms pivotably mounted on said support and which can be immersed in each of the compartments, at least one of the arms being mobile in translation relative to the support and means for fastening the substrate located at the lower end of each of the two arms.

8. An apparatus according to claim 4, wherein the means for transferring the substrate comprise two vertically mobile supports, which can be immersed into each of the compartments, means for fastening the substrate at the lower end of each of the supports, a rod placed within the liquid and rotatable about a vertical axis and means for fastening the substrate at each end of the rod.

9. An apparatus according to claim 4, wherein the means for transferring the substrate comprise a rotatable support and means for fixing the substrate to the support, the latter being placed in an opening of the partition level with the liquid surface and shaped in such a way that it prevents any contact between the monomolecular layers located in each of these compartments.

10. An apparatus according to claim 9, wherein the means for fixing the substrate to the support comprise at least one rod mounted on the support, said rod having a first end fixed to the support and a second end provided with means for fastening the substrate.

* * * * *